(12) United States Patent
Hoggarth et al.

(10) Patent No.: US 11,034,215 B2
(45) Date of Patent: Jun. 15, 2021

(54) VEHICLE VENTILATION SYSTEM

(71) Applicant: Ford Global Technologies, LLC, Dearborn, MI (US)

(72) Inventors: Marcus Hoggarth, Hertfordshire (GB); Kyle Loughlin, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 290 days.

(21) Appl. No.: 16/176,344

(22) Filed: Oct. 31, 2018

(65) Prior Publication Data

US 2019/0143792 A1    May 16, 2019

(30) Foreign Application Priority Data

Nov. 14, 2017   (GB) ..................... 1718762

(51) Int. Cl.
    *B60H 1/24* (2006.01)
    *B60H 1/00* (2006.01)
    *B60H 1/34* (2006.01)

(52) U.S. Cl.
    CPC ......... *B60H 1/246* (2013.01); *B60H 1/00564* (2013.01); *B60H 1/242* (2013.01); *B60H 1/243* (2013.01); *B60H 1/244* (2013.01); *B60H 1/247* (2013.01); *B60H 1/248* (2013.01); *B60H 1/3407* (2013.01)

(58) Field of Classification Search
    CPC .... B60H 1/246; B60H 1/00564; B60H 1/242; B60H 1/243; B60H 1/244; B60H 1/247; B60H 1/248; B60H 1/3407; B60H 2001/00192; B60H 2001/002

USPC ........................................... 454/142
    See application file for complete search history.

(56) References Cited

U.S. PATENT DOCUMENTS

| | | | |
|---|---|---|---|
| 2,523,923 A | 9/1950 | Rodert | |
| 3,330,200 A | 7/1967 | Gillick et al. | |
| 3,343,473 A | 9/1967 | Gillick | |
| 3,602,126 A * | 8/1971 | Breitschwerdt | ........ B60H 1/243 454/124 |
| 3,715,966 A | 2/1973 | Miettinen | |

(Continued)

FOREIGN PATENT DOCUMENTS

| | | |
|---|---|---|
| DE | 3744500 A1 | 7/1989 |
| FR | 1183336 A | 7/1959 |

(Continued)

*Primary Examiner* — Kenneth J Hansen
*Assistant Examiner* — Dana K Tighe
(74) *Attorney, Agent, or Firm* — David Coppiellie; Price Heneveld LLP

(57) ABSTRACT

A motor vehicle ventilation system configured to ventilate a cabin of the vehicle. The ventilation system comprises a duct extending about a perimeter of the vehicle cabin, at least one air flow inducer configured to induce a flow of air through the duct, the duct comprising an air inlet to receive a bulk flow of air from the flow inducer, and a first opening that extends about the perimeter of the vehicle cabin and that receives air from the duct. The first opening is configured to expel air into the vehicle cabin. The ventilation system further comprises a second opening that extends about the perimeter of the vehicle cabin and that draws air in from the vehicle cabin into a passage extending about the perimeter of the vehicle cabin, wherein a flow through the first opening entrains a flow from the second opening.

16 Claims, 9 Drawing Sheets

(56) References Cited

U.S. PATENT DOCUMENTS 6,186,886 B1 * 2/2001 Farrington ............. B60H 1/243
454/124
9,102,217 B2 * 8/2015 Stauffer .................... B60J 5/04

FOREIGN PATENT DOCUMENTS

| FR | 2374596 A1 | 7/1978 |
|----|------------|--------|
| FR | 2639008 A1 | 5/1990 |
| FR | 2858954 A1 | 2/2005 |
| JP | H0411714 U | 1/1992 |

* cited by examiner

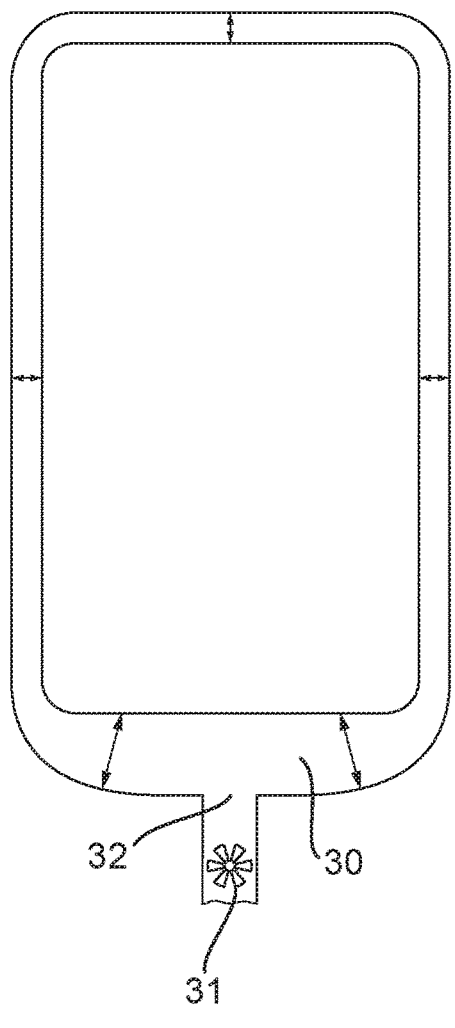
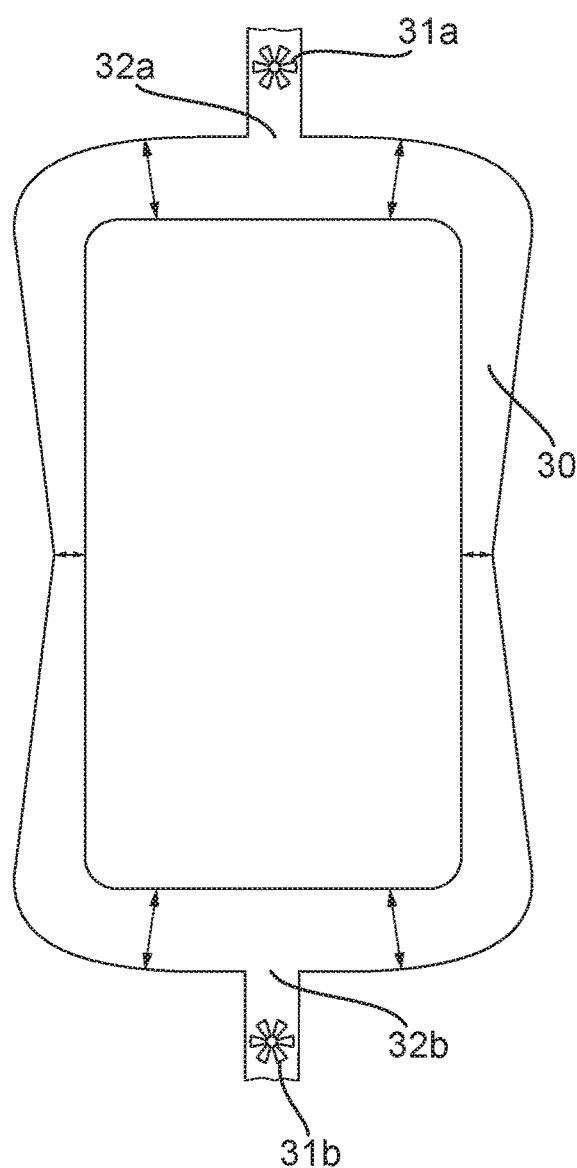

VEHICLE VENTILATION SYSTEM

FIELD OF THE INVENTION

The present invention generally relates to a vehicle ventilation system, and more particularly relates to a vehicle ventilation system that is configured to extend about the perimeter of a vehicle cabin.

BACKGROUND OF THE INVENTION

It is generally desirable to control the climate within a cabin of a vehicle, such as a motor vehicle. Traditional vehicle ventilation systems comprise vents that are directed at occupants of the vehicle. However, for vehicles with adaptable seating arrangements, the position of vents may not always be aligned with the position of a corresponding seat.

SUMMARY OF THE INVENTION

According to a first aspect of the present disclosure, there is provided a vehicle ventilation system configured to ventilate a cabin of the vehicle, such as a motor vehicle. The ventilation system comprises a duct extending around the perimeter of the vehicle cabin, at least one air flow inducer (such as a pump, fan etc.) configured to induce a flow of air through the duct, the duct comprising an air inlet to receive a bulk flow of air from the flow inducer, and a first opening that extends around the perimeter of the vehicle cabin and that receives air from the duct, the first opening being configured to expel air into the vehicle cabin.

The ventilation system may further comprise a second opening that extends about the perimeter of the vehicle cabin. The second opening may draw air in from the vehicle cabin into a passage extending about the perimeter of the vehicle cabin. A flow through the first opening may entrain a flow from the second opening.

The second opening may be configured to draw air in from the vehicle cabin in a predominantly, e.g., substantially, vertical direction when the vehicle is on a substantially horizontal surface. The first opening may be configured to expel air into the vehicle cabin in a predominantly, e.g., substantially, vertical direction.

The first opening may expel air so that the expelled air flows in a predominantly upwards direction. The second opening may draw air in so that the drawn in air may flow in a predominantly upwards direction. Alternatively, the air expelled from the first opening may flow in a predominantly downwards direction. Likewise, the air drawn into the second opening may flow in a predominantly downwards direction.

The cross-sectional flow area of the duct may vary about the perimeter of the vehicle cabin. The cross-sectional flow area of the duct may vary about the perimeter of the vehicle cabin to maintain a substantially constant pressure in the duct. The cross-sectional flow area of the duct may reduce away from the duct inlet.

The first opening may form a nozzle configured to accelerate the flow through the first opening. A side wall of the nozzle may present a side surface facing the vehicle cabin and extending around the perimeter of the vehicle cabin. The side surface may be arranged such that air is able to flow over the side surface and is entrained by a jet of air leaving the nozzle. The nozzle side surface may be formed from or may be conterminous with, e.g., a continuation of, an interior trim portion of the vehicle.

The first opening may be provided in a wall of the duct. The duct may be provided behind an interior trim portion of the vehicle. The first opening may extend through the interior trim portion. The interior trim portion may provide a wall of the duct.

The duct may extend through doors of the vehicle. Duct portions may be provided through respective doors and may be in fluidic communication with adjacent duct portions when the door is in a closed position.

The ventilation system may further comprise a structure spaced apart from an interior trim portion. The structure may extend around the perimeter of the vehicle cabin. The structure may be provided inside the vehicle cabin. The second opening may be defined by a gap between the interior trim portion of the vehicle and a wall of the structure spaced apart from the interior trim portion. The duct may be provided within the structure offset from the interior trim portion. The structure offset from the interior trim portion may generate a reduction in a cross-sectional area of the vehicle cabin in a horizontal plane of the vehicle cabin for a flow of air in the vertical direction.

The ventilation system may further comprise at least one valve provided in the duct and configured to selectively divide the duct into a plurality of separate zones. Each zone may have a respective air flow inducer associated therewith to induce a flow of air through the respective duct zone. Alternatively, two or more zones may share a common air flow inducer configured to induce a flow of air in a particular one or plurality of the two or more zones. The vehicle cabin may comprise four quadrants and there may be a duct zone for each quadrant of the vehicle cabin.

The ventilation system may further comprise at least one heating unit configured to heat air flowing in the duct. The heating unit may be provided in the duct. Alternatively, the heater unit may be provided outside the duct, e.g. in a passage upstream of the duct. There may be separate or at least independently controllable heater units for the duct zones.

The ventilation system may further comprise at least one air conditioning evaporator configured to cool air flowing in the duct. The evaporator may be provided in the duct. Alternatively, the evaporator may be provided outside the duct, e.g. in a passage upstream of the duct. There may be separate or at least independently controllable evaporators for the duct zones.

The ventilation system may comprise a controller configured to control one or more of the air flow inducer(s), valve(s), the heating unit(s) and/or air conditioning evaporator(s). The controller may receive data from one or more temperature sensors (internal and/or external to vehicle cabin) and one or more user interfaces with desired climate settings.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 8b is a partial sectional view of the ventilation system showing a second sectional view spaced apart from the first sectional view shown in FIG. 8a;

FIG. 12 is a schematic plan view of a ventilation system according to an example of the present disclosure;

FIG. 13 is a schematic plan view of a ventilation system according to another example of the present disclosure;

DETAILED DESCRIPTION OF THE PREFERRED EMBODIMENTS

Figure 1:
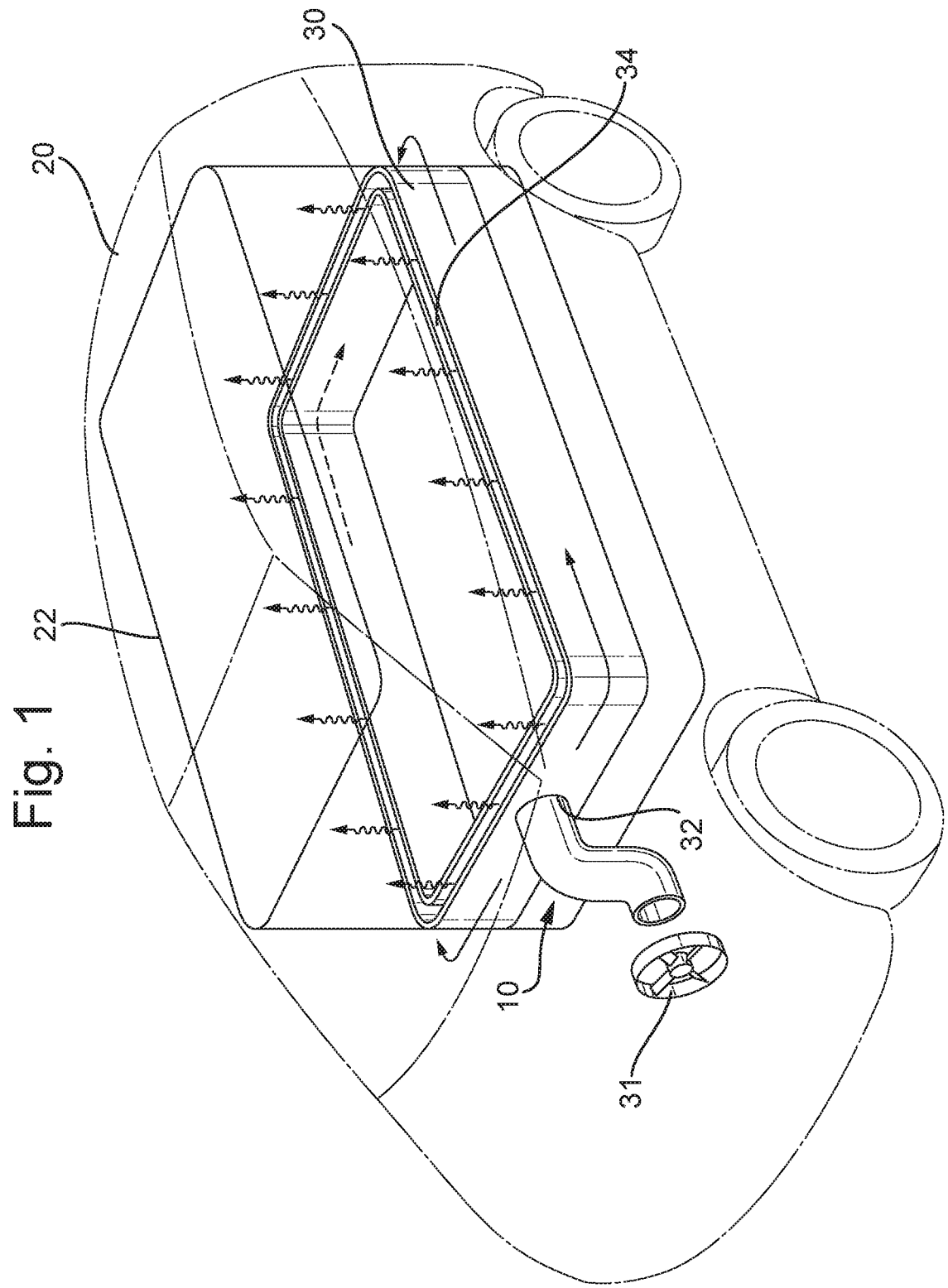
FIG. 1 is a perspective view of a vehicle comprising a ventilation system for a cabin of the vehicle according to an example of the present disclosure.

With reference to FIG. 1, the present disclosure relates to a ventilation system 10 for a vehicle 20. The vehicle 20 may be a motor vehicle (i.e. an automobile) or any other type of vehicle. The ventilation system 10 is configured to ventilate a cabin 22 of the vehicle 20. The cabin 22 may define a space in which occupants of the vehicle 20 reside, e.g., during motion of the vehicle 20. The cabin 22 may comprise one or more seats (not depicted) for the occupants of the vehicle 20 to sit upon.

The ventilation system 10 comprises a duct 30 extending about a perimeter of the vehicle cabin 22. The duct 30 provides a passage for air to flow around the perimeter of the vehicle cabin 22. The duct 30 may extend entirely around the perimeter or substantially most of the perimeter of the vehicle cabin 22. The duct 30 extends in a transverse plane of the vehicle 20. As a result, the duct 30 may direct the flow of air in longitudinal and lateral directions of the vehicle 20. The air may circulate around the duct 30.

At least one flow inducer, such as a fan 31, is configured to induce a flow of air through the duct 30. The duct 30 comprises an air inlet 32 to receive a bulk flow of air from the fan 31. The fan 31 may receive air from outside the vehicle 20 and/or inside the vehicle 20.

Air from the duct 30 flows through a first opening 34 and into the cabin 22. The first opening 34 extends about the perimeter of the vehicle cabin 22 and receives air from the duct 30. In the example depicted in FIG. 1, the first opening 34 is provided in a wall of the duct 30. As for the duct 30, the first opening 34 extends in the transverse plane of the vehicle 20, e.g., extending in the longitudinal and lateral directions about the perimeter of the vehicle cabin 22. For example, the first opening 34 may be provided at or towards the top of the duct 30. The duct 30 and first opening 34 are both elongate and extend around the vehicle cabin perimeter.

Figure 2:
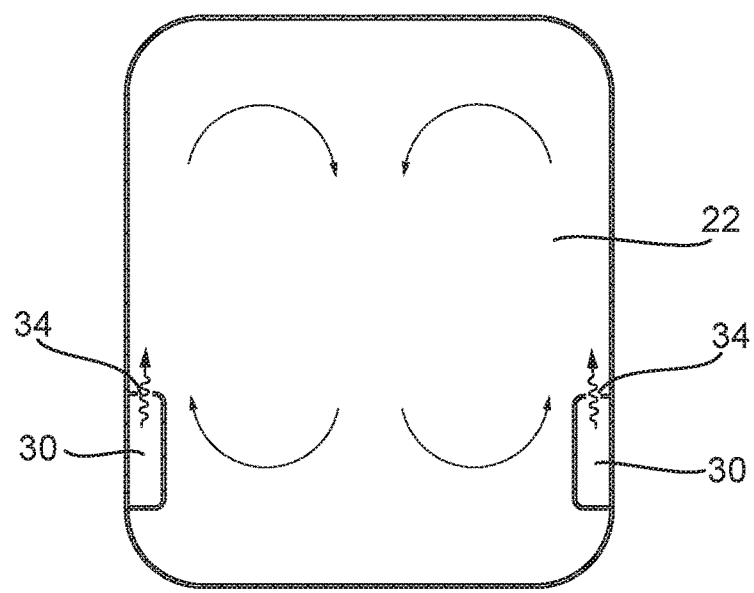
FIG. 2 is a schematic sectional view of a vehicle cabin according to the example of the present disclosure depicted in FIG. 1.

With reference to FIG. 2, the first opening 34 is configured to expel air into the vehicle cabin 22 from the duct 30. The flow of air through the first opening 34 encourages the circulation of air throughout the vehicle cabin 22 and in particular promotes convection currents within the vehicle cabin 22. In this way, the flow through the vehicle cabin is enhanced and the occupants of the vehicle have the sense of the air within the vehicle cabin 22 continually being refreshed. FIG. 2 depicts a sectional view of the vehicle cabin 22, however, it will be appreciated that as the first opening 34 extends about the perimeter of the vehicle, similar flow patterns will exist at other sections of the vehicle cabin.

In the arrangements shown in FIGS. 1 and 2, the first opening 34 is provided at the top of the duct 30. However, in other arrangements the first opening 34 may be provided at other positions relative to the duct 30. In either case, the first opening 34 may be configured to expel air into the vehicle cabin 22 in a predominantly, e.g. substantially, vertical direction.

Figure 3:
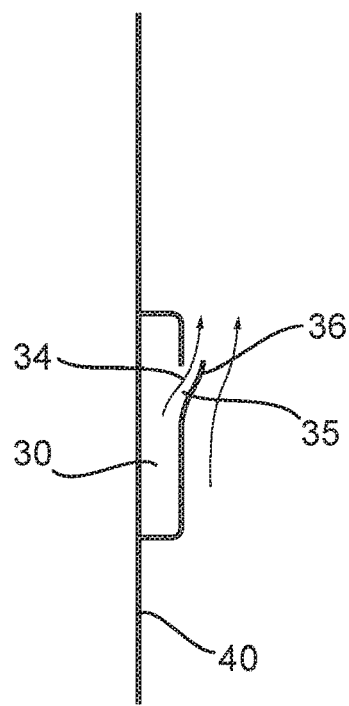
FIG. 3 is a partial sectional view of the ventilation system according to the example of the present disclosure depicted in FIG. 1.
Figure 4:
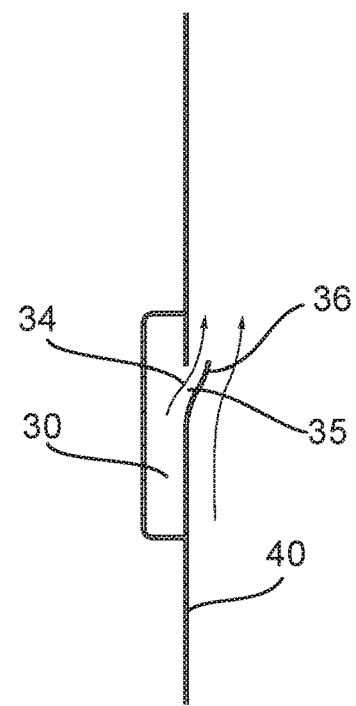
FIG. 4 is a partial sectional view of the ventilation system according to another example of the present disclosure.

With reference to FIGS. 3 and 4, the first opening 34 may form a nozzle 35. The nozzle 35 may accelerate the flow through the first opening 34. A side wall 36 of the nozzle 35 may present a side surface facing the vehicle cabin 22. The side wall 36 may extend around the perimeter of the vehicle cabin 22 in a similar manner to the first opening 34. The nozzle 35 may direct air flowing through the opening 34 in a direction that is substantially parallel to the side wall 36 of the nozzle. The side surface of the side wall 36 may be arranged such that air is able to flow over the side surface and be entrained by a jet of air leaving the nozzle 35. To facilitate this, the side surface of the nozzle side wall 36 may be substantially parallel to the direction of flow leaving the nozzle 35. Furthermore, the nozzle side surface may be a continuation of a surrounding surface facing the vehicle cabin 22, which may present a smooth surface so as to minimize disturbance of the flow towards the nozzle 35 outside of the duct 30.

Referring to FIG. 3, the duct 30 may be provided proud of an interior trim wall 40. The first opening 34 may be provided in a wall of the duct 30 that faces the vehicle cabin 22. Alternatively, as depicted in FIG. 4, the duct 30 may be provided behind the interior trim wall 40. In which case, the first opening 34 may extend through the interior trim wall 40. In the particular arrangement shown, the interior trim wall 40 may provide a wall of the duct 30. The nozzle side surface may be a continuation of the interior trim wall 40.

In an alternative arrangement (not shown), the interior trim wall 40 may transition across the duct 30 such that a portion of the interior trim wall 40 above the duct 30 is set back from a portion of the interior trim wall 40 that is below the duct 30. Accordingly, a top edge of the duct 30 may be exposed to the vehicle cabin 22. By way of example, the interior trim wall 40 may transition at the first opening 34 such that a portion of the interior trim wall above the first opening may be set back from the portion of the interior trim wall 40 below the first opening 34. The transition in the interior trim wall portion may thus define the first opening 34.

Figure 5:
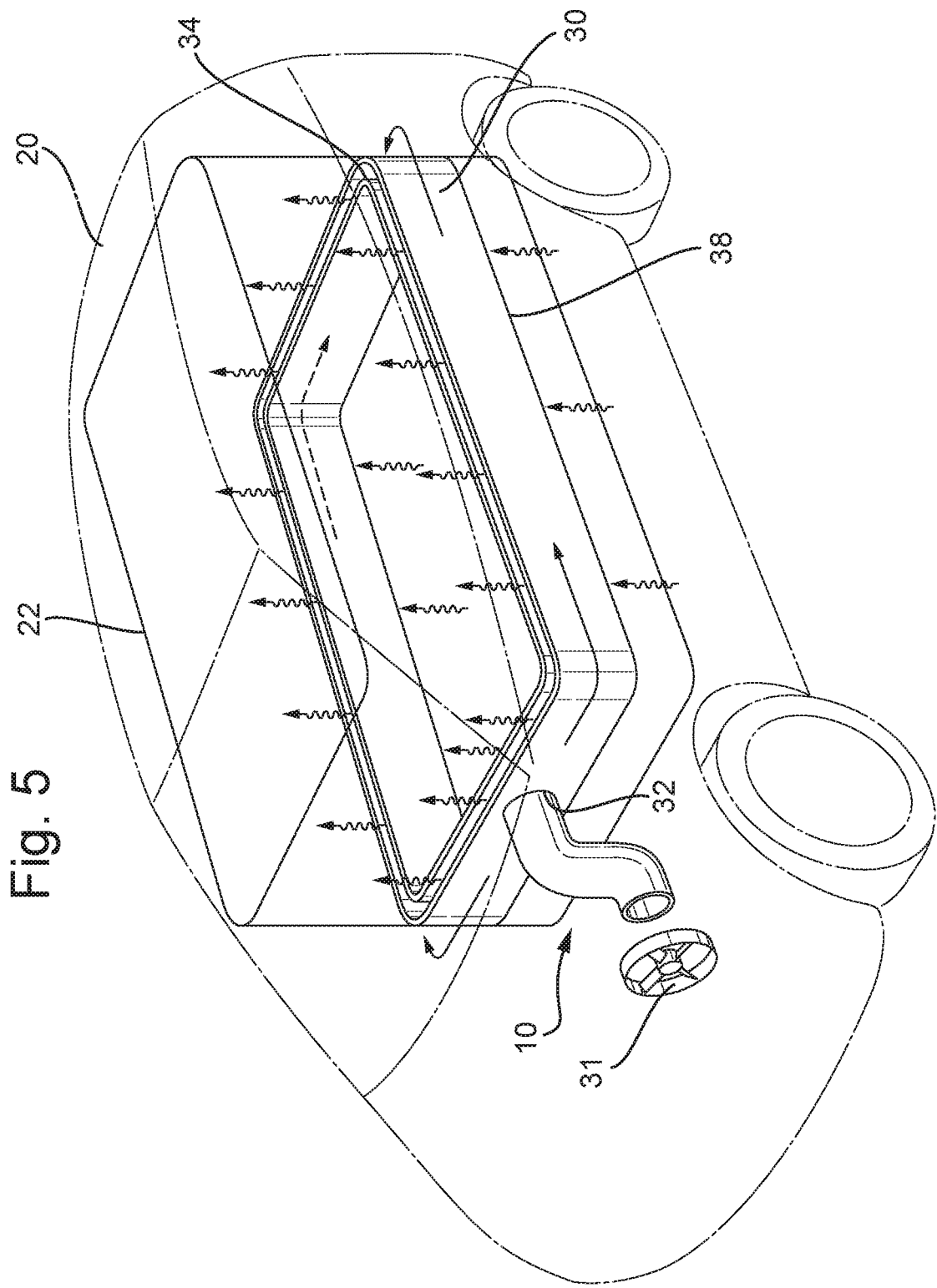
FIG. 5 is a perspective view of a vehicle comprising a ventilation system for a cabin of the vehicle according to an example of the present disclosure.
Figure 6:
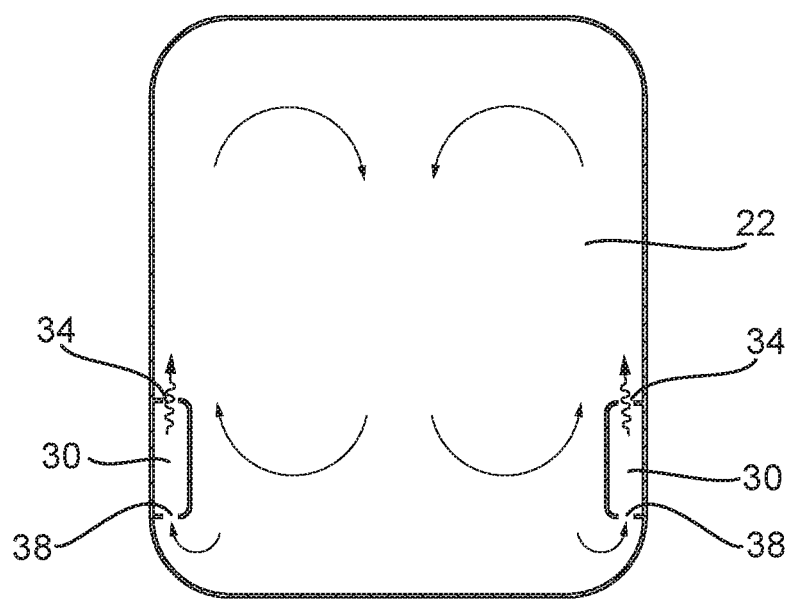
FIG. 6 is a schematic sectional view of a vehicle cabin according to the example of the present disclosure depicted in FIG. 5.

With reference to FIGS. 5 and 6, the ventilation system 10 may further comprise a second opening 38 that extends about the perimeter of the vehicle cabin 22. As for the first opening 34, the second opening 38 may be elongate and may extend in the transverse plane of the vehicle 20, e.g., in longitudinal and lateral directions. The second opening 38 may draw air in from the vehicle cabin 22. As depicted, in FIGS. 5 and 6, a second opening 38 may draw air in from the vehicle cabin in a predominately, e.g., substantially, vertical direction i.e., perpendicular to the transverse plane of the vehicle 20. As shown in FIG. 6, drawing air in from the vehicle cabin 22 into the second opening 38 may further improve the circulation of air within the vehicle cabin 22.

FIGS. 5 and 6 show the first opening 34 expelling air in a substantially upwards and vertical direction. However, it is also envisaged that the first opening 34 may emit air in other directions, e.g., in a downwards direction. FIGS. 5 and 6 also show the second opening 38 drawing air in a substantially vertical direction, e.g., an upwards direction. Again, however, the second opening 38 may draw in air from other directions, e.g., in a downwards direction.

Figure 7:
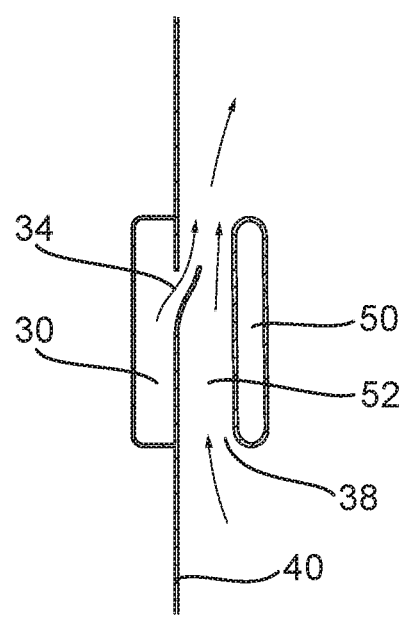
FIG. 7 is a partial sectional view of the ventilation system according to the example of the present disclosure depicted in FIG. 5.

Referring now to FIGS. 7 and 8, the ventilation system 10 may further comprise a structure 50 spaced apart from the interior trim wall 40. The structure 50 may be provided inside the vehicle cabin 22 and extend around the perimeter of the vehicle cabin, e.g., in a similar fashion to the duct 30. The second opening 38 may be defined by a gap between the interior trim wall 40 and a wall of the structure 50 spaced apart from the interior trim wall 40. Accordingly, the second opening 38 may draw air in from the vehicle cabin 22 into a passage 52 that extends about the perimeter of the vehicle cabin 22. The passage 52 may be defined by the structure 50 being spaced apart from the interior trim wall 40 and the passage 52 is thus provided between the structure 50 and the interior trim portion 40. The first opening 34 may open out into the passage 52. A flow through the first opening 34 may entrain a flow within the passage 52, which may in turn draw air in through the second opening 38.

Figure 8A:
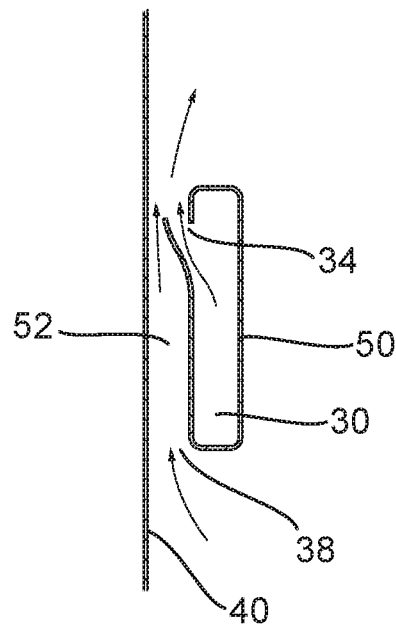
FIG. 8a is a partial sectional view of the ventilation system according to another example of the present disclosure showing a first sectional view.
Figure 8B:
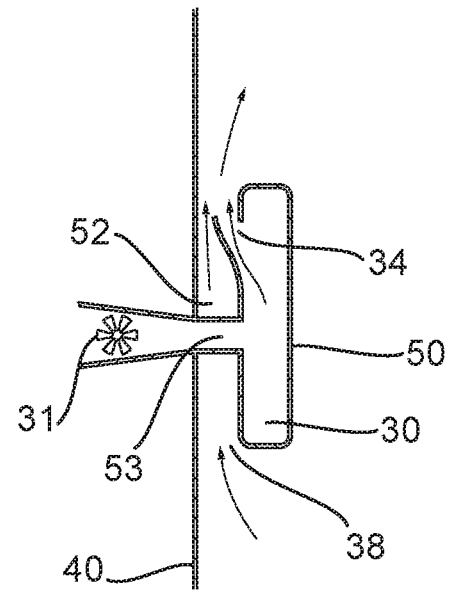

As depicted in FIG. 7, the duct 30 may be spaced apart from the structure 50. For example, as depicted, the duct 30 may be provided behind the interior trim wall 40. However, as depicted in FIGS. 8a and 8b, the duct 30 may instead be provided within the structure 50 that is offset from the interior trim wall 40. The first opening 34 may thus be provided in the structure 50. For example, as depicted, the first opening 34 may be on a side of the structure 50 that faces the interior trim wall 40. In order to provide the duct 30 with air, a connecting passage 53 shown in FIG. 8b may extend from the fan 31 to the structure 50 and may extend across the passage 52 between the structure 50 and interior trim wall 40 at one or more locations about the perimeter of the vehicle cabin. FIG. 8b is a sectional view at one such location, whereas FIG. 8a is a sectional view away from such a location. The connecting passage 53 may interrupt the flow through the passage 52, but only where the connecting passage is present and the air flow in the passage 52 may flow around the connecting passage 53.

Figure 9:
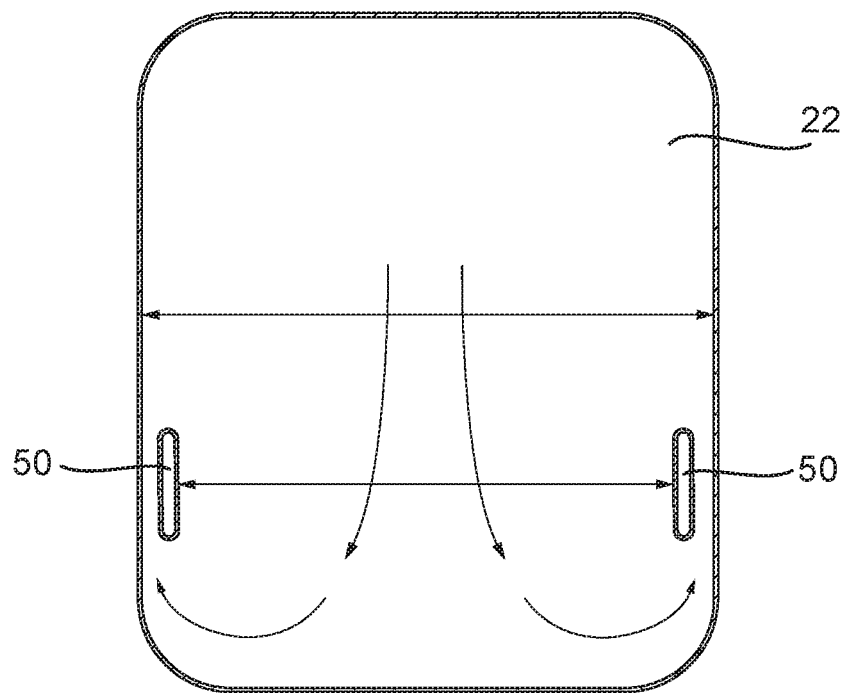
FIG. 9 is a schematic sectional view of a vehicle cabin according to an example of the present disclosure.

With reference to FIG. 9, the structure 50 may be provided on both sides of the vehicle cabin 22 since the structure 50 extends about the perimeter of the vehicle cabin 22. The structure 50 may cause a reduction in the cross-sectional area of the vehicle cabin in a transverse plane of the vehicle cabin. A flow of air within the vehicle cabin 22 may thus experience a reduction in the cross-sectional area through which it can flow. Accordingly, the velocity of the flow may increase between the structures 50 on opposite sides of the cabin. This in turn may reduce the pressure of the air between the opposite structures 50. This reduction in pressure may further assist the ventilation system 10 drawing in air into the second opening 38. This arrangement therefore assists in inducing further flow within the vehicle cabin 22. A similar benefit may be obtained with the arrangement depicted in FIGS. 5 and 6 without the offset structure 50.

Figure 10:
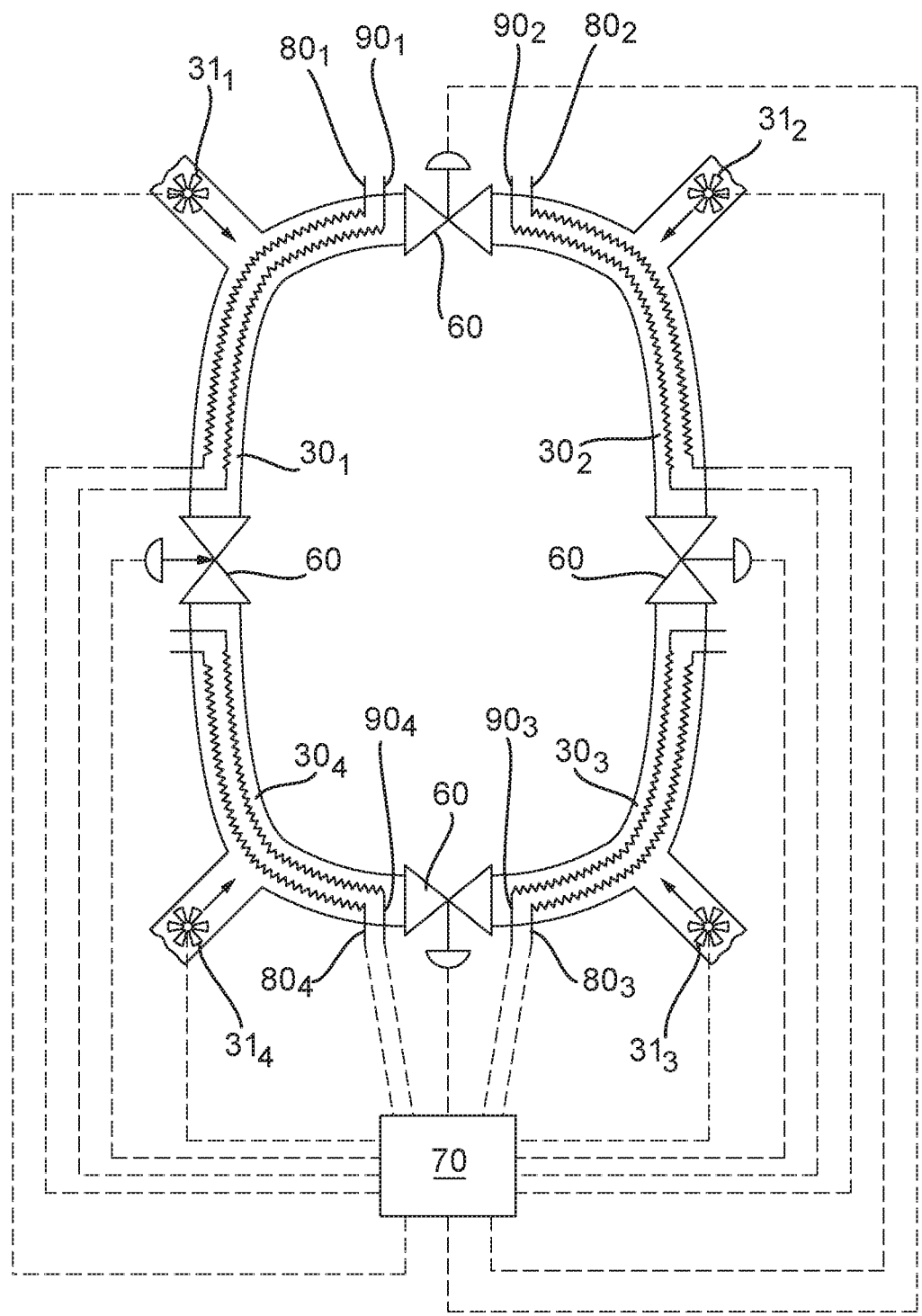
FIG. 10 is a schematic plan view of a ventilation system according to an example of the present disclosure.

With reference to FIG. 10, the ventilation system 10 may further comprise at least one valve 60 provided in the duct 30 and configured to selectively divide the duct into a plurality of separate duct zones $30_1, 30_2, 30_3, 30_4$. Each duct zone $30_1, 30_2, 30_3, 30_4$ may have a respective fan $31_1, 31_2, 31_3, 31_4$ associated therewith. The associated fan may induce the flow of air through the respective duct zone. One of the valves 60 may be provided between each neighboring pair of duct zones. When a particular valve 60 is open the duct zones either side of the particular valve be in fluidic communication. By contrast, when a particular valve 60 is closed the neighboring duct zones may not be in fluidic communication. In the particular example shown in FIG. 10, the duct 30 may be divided into four zones with one for each quadrant of the vehicle cabin 22, however, other number of duct zones are also contemplated.

In the arrangement shown in FIG. 10, each of the duct zones $30_1, 30_2, 30_3, 30_4$ has a fan $31_1, 31_2, 31_3, 31_4$ associated therewith. However, in the arrangement depicted in FIG. 11 two or more of the duct zones may share a common fan, which may be arranged to induce a flow of air in the two or more duct zones. For example, the fan 31a may provide air to one or both of the duct zones $31_1, 31_2$. Likewise, the fan 31b may provide air to one or both of the duct zones $30_3, 30_4$. A valve arrangement 60a may be provided where air from the fan 31a meets the duct 30. In the particular example shown, the valve arrangement 60a may comprise a pair of valves provided either side of the point at which the air from the fan 31a meets the duct 30. The pair of valves 60a may permit air to flow into the respective duct zones $31_1, 31_2$. However, in an alternative arrangement, a single valve may be provided at the point where air from the fan 31a meets the duct 30. Such a single valve may be configured to permit a flow to the duct zone $31_1$ and/or the duct zone $30_2$. A similar arrangement applies where the air from the fan 31b meets the duct 30, for example with a valve arrangement 60b. In either of the arrangements depicted in FIGS. 10 and 11, a valve 60 may be provided between duct zones $31_1, 31_4$ and another valve 60 may be provided between duct zones $30_2, 30_3$.

The ventilation system 10 may further comprise a controller 70 configured to control components of the ventilation system 10, such as the valves 60. For example, the controller 70 may isolate particular ones of the duct zones $30_1, 30_2, 30_3, 30_4$ by opening and closing particular ones of the valves 60. In this way, a particular fan may provide air to one or more of the duct zones and another fan may provide air to others of the duct zones. This may be desirable if particular zones within the vehicle cabin 22 require a different flow rate of air or different air temperatures. Alternatively, the valve 60 may be open and one or more of the fans 31 may provide air to the entire duct 30.

Figure 11:
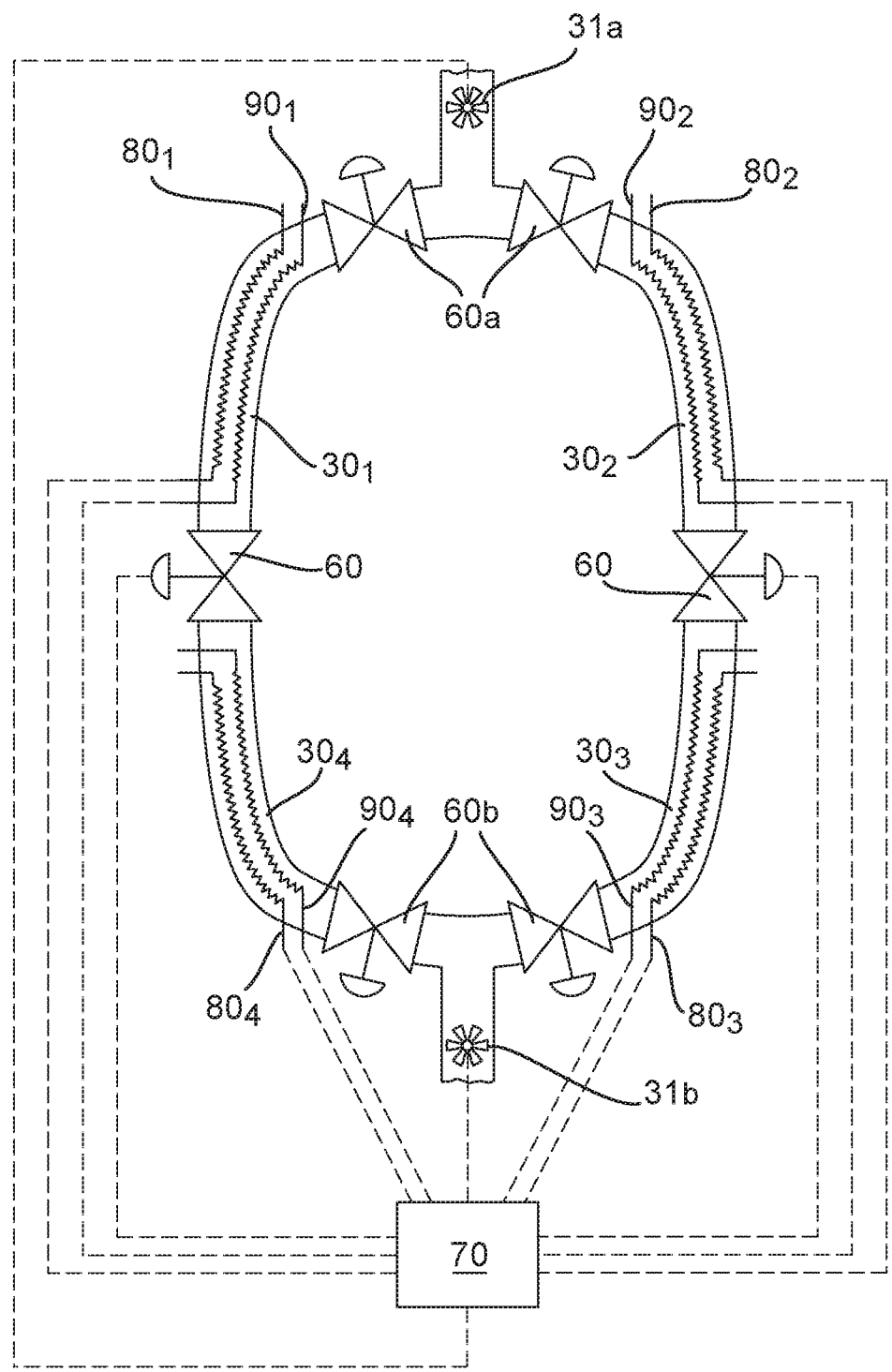
FIG. 11 is a schematic plan view of a ventilation system according to another example of the present disclosure.

As depicted in FIGS. 10 and 11, the ventilation system 10 may further comprise at least one heating unit 80 configured to heat air flowing in the duct 30. For example, each of the duct zones $30_1$, $30_2$, $30_3$, $30_4$ may be provided with a respective heating unit $80_1$, $80_2$, $80_3$, $80_4$. As depicted, the heating unit 80 may be provided in the duct 30, in particular one of the heating units $80_1$, $80_2$, $80_3$, $80_4$ may be provided in a respective duct zone $30_1$, $30_2$, $30_3$, $30_4$. In an alternative arrangement, the heating unit may be provided outside of the duct, e.g., in a passage upstream of the duct either upstream or downstream of the fan 31. The heating units 80 may be operatively coupled to and controlled by the controller 70. In the case where there are separately controllable heating units for respective duct zones, these may be independently controlled by the controller 70. In this way, different temperatures may be obtained for a particular zone within the vehicle cabin 22.

As depicted in FIGS. 10 and 11, the ventilation system may further comprise at least one air conditioning evaporator 90 configured to cool air flowing in the duct 30. For example, each of the duct zones $30_1$, $30_2$, $30_3$, $30_4$ may be provided with an evaporator $90_1$, $90_2$, $90_3$, $90_4$. As depicted the evaporator may be provided in the duct 30, in particular one of the evaporators $90_1$, $90_2$, $90_3$, $90_4$ may be provided in a respective duct zone $30_1$, $30_2$, $30_3$, $30_4$. In an alternative arrangement, the evaporator may be provided outside of the duct, e.g., in a passage upstream of the duct either upstream or downstream of the fan 31. The evaporators 90 may be operatively coupled to and controlled by the controller 70. In the case where there are separately controllable evaporators for respective duct zones, these may be independently controlled by the controller 70. In this way, different temperatures may be obtained for a particular zone within the vehicle cabin 22.

As mentioned above, the ventilation system 10 may comprise the controller 70 configured to control one or more components of the ventilation system. For example, the controller 70 may control one or more of the fans 31, valves 60, heating units 80, and/or air conditioning evaporators 90. The controller 70 may receive data from one or more temperature sensors (not shown), which may be internal and/or external to the vehicle cabin. The controller 70 may also receive data from one or more user interfaces with which an occupant of the vehicle may input their desired climate settings, such as for a particular zone of the vehicle cabin 22.

Referring now to FIGS. 12 and 13, the cross-sectional flow area of the duct 30 may vary about the perimeter of the vehicle cabin 22. For example, the cross-sectional flow area of the duct 30 may vary about the perimeter of the vehicle cabin to maintain a substantially constant pressure within the duct 30. The particular examples shown in FIGS. 12 and 13 depict the dimension of the duct 30 in the transverse plane varying about the perimeter of the duct 30. However, it is also envisaged that the dimension of the duct perpendicular to the transverse plane depicted in FIGS. 12 and 13 may additionally or alternatively vary about the perimeter of the vehicle cabin. Either or both of these dimensions may vary to change the cross-sectional flow area of the duct to maintain a substantially constant pressure within the duct. In the example depicted in FIG. 12, there is a single inlet 32 providing air from the fan 31 to the duct 30. The cross-sectional flow area of the duct 30 reduces downstream of the inlet to a minimum cross-sectional area at a point of the duct 30 opposite the inlet 32. By contrast, in the arrangement depicted in FIG. 13, there are two inlets 32 providing air from fans 31a, 31b to the duct 30. In this case, the cross-sectional area of the duct 30 reduces downstream of each inlet 32a, 32b to points either side of the duct 30 and between the inlets 32a, 32b.

Figure 14A:
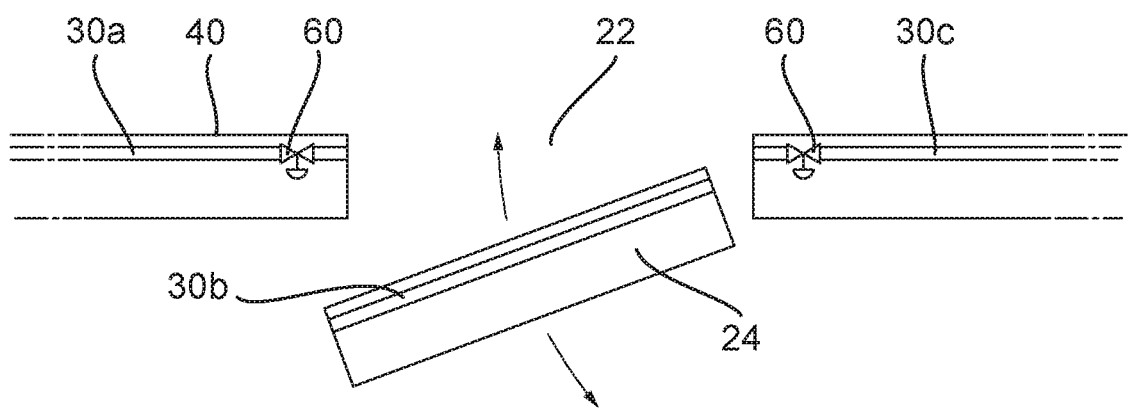
FIG. 14a is a partial sectional view of a door for a vehicle shown in an open position, according to an example of the present disclosure.
Figure 14B:
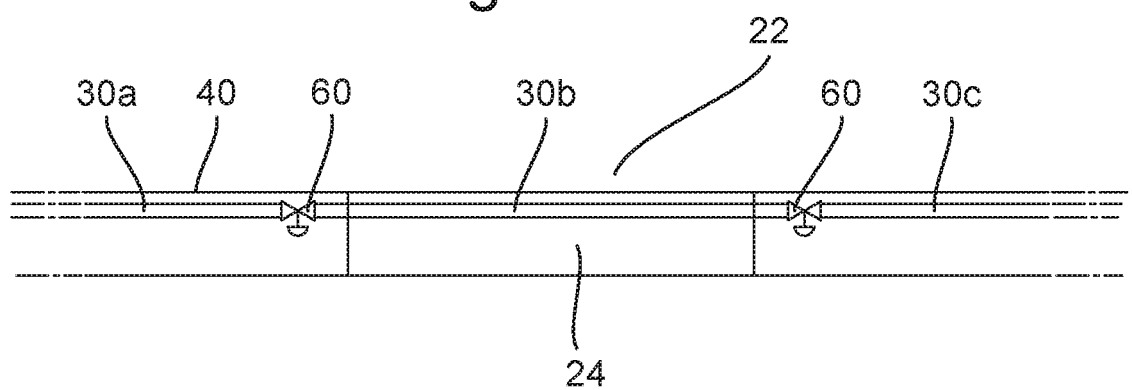
FIG. 14b is a partial sectional view of the door of FIG. 14a shown in the closed position.

With reference to FIGS. 14a and 14b, the duct 30 may extend through doors 24 of the vehicle 20. A particular door 24 may open to reveal an opening into the vehicle cabin 22. A portion 30b of the duct may be provided within a particular door and may extend through the door in the transverse plane of the vehicle 20. As depicted in FIG. 14b, the duct portion 30b may be in fluidic communication with duct portions 30a, 30c either side of the door when the door is in the closed position. Valves 60 may be provided in the duct portions 30a, 30c either side of the door 24. The controller 70 may close such valves when the door 24 is opened so that a flow of air into the vehicle cabin 22 can be maintained when the door is in an open position. Such valves may be opened by the controller 70 when the door 24 is in the closed position, as depicted in FIG. 14b. A door sensor may determine the position of the door 24 and the controller 70 may receive data from the door sensor to determine whether the door is in an open or closed position. The first opening 34 described above may also extend across the door 24. Likewise, in the case of the second opening 38 being provided, the second opening 38 may also extend across the door 24.

It will be appreciated by those skilled in the art that although the invention has been described by way of example, with reference to one or more examples, it is not limited to the disclosed examples and alternative examples may be constructed without departing from the scope of the invention as defined by the appended claims.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle ventilation system comprising:
   a duct extending around a perimeter of a vehicle cabin;
   at least one air flow inducer configured to induce a flow of air through the duct, the duct comprising an air inlet to receive a bulk flow of air from the flow inducer;
   a first opening extending around the perimeter of the vehicle cabin to receive air from the duct and configured to expel the air into the vehicle cabin; and
   an integrally formed nozzle extending outward from the duct and configured to accelerate the flow through the first opening, wherein a side wall of the nozzle presents a side surface facing the vehicle cabin and extending around the perimeter of the vehicle cabin, the side surface being arranged such that vehicle cabin air is able to flow over the side surface and is entrained by a jet of the air leaving the nozzle, and wherein the nozzle side surface is formed from or is conterminous with an interior trim portion of the vehicle cabin, wherein the duct extends through doors of the vehicle cabin with duct portions being provided through respective doors and being in fluidic communication with adjacent duct portions when the door is in a closed position.

2. The vehicle ventilation system of claim 1 further comprising a second opening that extends about the perimeter of the vehicle cabin and that draws the vehicle cabin air in from the vehicle cabin into a passage extending about the perimeter of the vehicle cabin, wherein a flow through the first opening entrains a flow from the second opening.

3. The vehicle ventilation system of claim 2, wherein the second opening is configured to draw the vehicle cabin air in from the vehicle cabin in a predominantly vertical direction.

4. The vehicle ventilation system of claim 1, wherein the first opening is configured to expel the air into the vehicle cabin in a predominantly vertical direction.

5. The vehicle ventilation system of claim 1, wherein a cross-sectional flow area of the duct varies about the perimeter of the vehicle cabin to maintain a substantially constant pressure in the duct.

6. The vehicle ventilation system of claim 5, wherein the cross-sectional flow area of the duct reduces away from the duct inlet.

7. The vehicle ventilation system of claim 1, wherein the first opening is provided in a wall of the duct.

8. The vehicle ventilation system of claim 1, wherein the duct is provided behind the interior trim portion of the vehicle cabin and the first opening extends through the interior trim portion.

9. The vehicle ventilation system of claim 1 further comprising a structure spaced apart from the interior trim portion, wherein the structure extends around the perimeter of the vehicle cabin, wherein a second opening is defined by a gap between the interior trim portion of the vehicle cabin and a wall of the structure spaced apart from the interior trim portion.

10. The vehicle ventilation system of claim 1 further comprising at least one valve provided in the duct and configured to selectively divide the duct into a plurality of separate zones.

11. The vehicle ventilation system of claim 10, wherein each zone has a respective air flow inducer associated therewith to induce a flow of air through the respective duct zone.

12. The vehicle ventilation system of claim 10, wherein two or more zones share a common air flow inducer configured to induce a flow of air in a particular one or plurality of the two or more zones.

13. The vehicle ventilation system of claim 10 further comprising at least one heating unit configured to heat air flowing in the duct, and wherein the heating unit is provided in the duct.

14. The vehicle ventilation system of claim 13 further comprising at least one air conditioning evaporator configured to cool air flowing in the duct, and wherein the evaporator is provided in the duct.

15. A vehicle ventilation system comprising:
a duct extending around a perimeter of a vehicle cabin;
at least one air flow inducer configured to induce a flow of air through the duct, the duct comprising an air inlet to receive a bulk flow of air from the flow inducer;
a first opening extending around the perimeter of the vehicle cabin to receive air from the duct and configured to expel the air into the vehicle cabin; and
an integrally formed nozzle extending outward from the duct and configured to accelerate the flow through the first opening, wherein a side wall of the nozzle presents a side surface facing the vehicle cabin and extending around the perimeter of the vehicle cabin, the side surface being arranged such that vehicle cabin air is able to flow over the side surface and is entrained by a jet of the air leaving the nozzle, and wherein the nozzle side surface is formed from or is conterminous with an interior trim portion of the vehicle cabin; and
a structure spaced apart from the interior trim portion, wherein the structure extends around the perimeter of the vehicle cabin, wherein a second opening is defined by a gap between the interior trim portion of the vehicle cabin and a wall of the structure spaced apart from the interior trim portion, and wherein the duct is provided within the structure offset from the interior trim portion.

16. The vehicle ventilation system of claim 15, wherein the structure offset from the interior trim portion generates a reduction in a cross-sectional area of the vehicle cabin in a horizontal plane of the vehicle cabin for a flow of air in the vertical direction.

\* \* \* \* \*